(12) United States Patent
Gräbner et al.

(10) Patent No.: US 6,221,965 B1
(45) Date of Patent: Apr. 24, 2001

(54) METHOD FOR PRODUCING A THERMOPLASTIC ELASTOMER MATERIAL

(75) Inventors: Friedrich Wilhelm Gräbner, Stelle; Udo Markiewicz, Hamburg; Jörg Vortkort, Toppenstedt, all of (DE)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 09/297,598

(22) PCT Filed: Nov. 10, 1997

(86) PCT No.: PCT/DE97/02618

§ 371 Date: May 4, 1999

§ 102(e) Date: May 4, 1999

(87) PCT Pub. No.: WO98/21267

PCT Pub. Date: May 22, 1998

(30) Foreign Application Priority Data

Nov. 14, 1996 (DE) .............................. 196 46 969

(51) Int. Cl.[7] ...................................... C08F 8/00
(52) U.S. Cl. .......................... 525/192; 525/194; 525/197; 525/198
(58) Field of Search ..................... 525/192, 194, 525/197, 198

(56) References Cited

U.S. PATENT DOCUMENTS

| 3,806,558 | 4/1974 | Fischer . |
| 4,130,535 | 12/1978 | Coran . |
| 4,311,628 | 1/1982 | Abdou-Sabet . |

FOREIGN PATENT DOCUMENTS

| 26 32 654 | 2/1977 | (DE) . |
| 27 19 095 | 7/1984 | (DE) . |
| 37 12 749 | 7/1988 | (DE) . |
| 39 08 415 | 9/1990 | (DE) . |
| 37 25 641 | 4/1992 | (DE) . |
| 91 11 406 | 5/1992 | (DE) . |
| 0 072 203 | 8/1982 | (EP) . |
| 0 107 635 | 8/1983 | (EP) . |
| 0 317 346 | 5/1989 | (EP) . |
| 0 547 843 | 12/1992 | (EP) . |
| 0 539 322 | 4/1993 | (EP) . |
| 2007683 | 5/1979 | (GB) . |

*Primary Examiner*—Nathan M. Nutter
(74) *Attorney, Agent, or Firm*—Collard & Roe, P.C.

(57) ABSTRACT

A method for producing a thermoplastic elastomer material in the form of a mixture of one or more thermoplastics and one or more crosslinked rubbers. Said mixture contains the following constituents: one or more thermoplastics for 10–90%, one or several non-crosslinked rubbers, a crosslinking activator, a crosslinking agent, possibly other additives. Said process involves the use of a roll system characterized by the following process steps: the thermoplastic(s) and/or the non-crosslinked rubber(s) are introduced into the roll system through the feeding opening in the absence of the crosslinking agent and are subsequently melted and dispersed with formation of a homogenous mixture; the homogenous mixture is conveyed in the roll elements at the same time as the crosslinking agent is delivered to a transition area in the roll elements; the mixture provided with the crosslinking agent is dispersed and homogenized at the same time as vulcanization at high extension rates with formation of the thermoplastic elastomer material. The calendered surface amounts to $\geq 75$ m$^2$ thermoplastic elastomer per kilo in relation to the totality of roll elements. Another variation of the method is also disclosed.

24 Claims, 1 Drawing Sheet

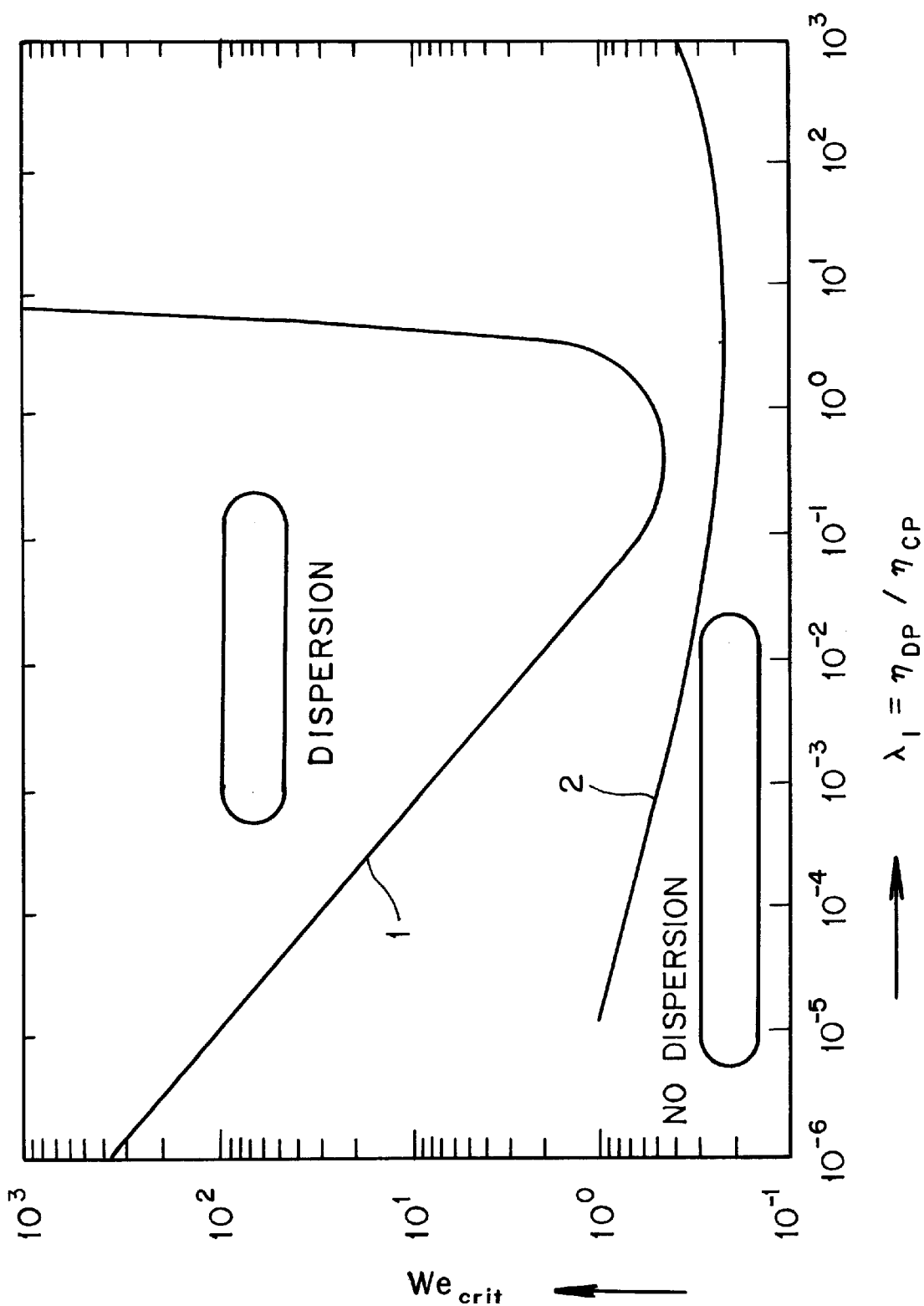

METHOD FOR PRODUCING A THERMOPLASTIC ELASTOMER MATERIAL

BACKGROUND OF THE INVENTION

1. Field of the Invention

The invention relates to a process for producing a thermoplastic elastomer compound (TPE) in the form of a mixture of one or a plurality of thermoplastics and one or a plurality of crosslinked rubbers, such a mixture being produced from one or a plurality of thermoplastics in an amount of from 10 to 90% by weight;

one or a plurality of rubbers;

a crosslinking activator;

crosslinking agents, as well as other additives, if required;

with the use of a roll system comprising a feeding opening of a conveying screw feeding the first roll element, as well as additional roll elements with point for adding other materials within a transition area of the roll elements, whereby each roll element has a main spindle (central spindle) and a plurality of rotating spindles, and whereby, furthermore, the components of the mixture are fed into the roll system via the feeding opening and the points for adding other materials.

2. The Prior Art

The elastomer compound of the type specified above is a blend consisting of a thermoplastic material and a crosslinked rubber. Crosslinking of the rubber is carried out by dynamic vulcanization. The term "dynamic vulcaniztion" is understood to be a process in which the thermoplastic material, the rubber and the crosslinking system are masticated (melted open and dispersed) as the rubber is being crosslinked. Examples of dynamically crosslinked thermoplastic elastomers and the process of dynamic vulcanization are described in U.S. Pat. Nos. 4,130,535 and 4,311,628. German laid-open patent specification 26 32 654 describes a blend consisting of a thermoplastic polyolefin, an EPDM rubber and any desired crosslinking system known from U.S. Pat. No. 3,806,558. The rubber is vulcanized to such an extent that it contains no more than about three percent of rubber extractable in cyclohexane at 23° C. Furthermore GB-A-2 007 683 describes a thermoplastic elastomer containing a thermoplastic crystalline polyolefin resin and vulcanized EPDM. Crosslinking of the rubber is carried out in a phenolic resin. The degree of crosslinking so obtained exceeds 97%. It is pointed out in EP 0 107 635 B2 that the blending methods employed conventionally up until that time for producing the dynamically vulcanized thermoplastic elastomers are not suitable for producing soft mixtures with good extrudability. Said document describes a one-stage process carried out on a double-screw extruder with screws rotating in the same sense, which, at high shearing rates of $>2000$ s$^{-1}$ and with a dwelling time of <2 minutes permits the manufacture of soft thermoplastic elastomers with good extrudability. Masticating of the rubber and other components takes place in the first third of the double-screw extruder. Dynamic vulcanizing takes place in the last two thirds. A similar process for the production of a dynamically vulcanized thermoplastic elastomer is described in EP 0 072 203 A2, where in a one-stage process carried out on a double-screw extruder with screws revolving in the same sense, a partially crosslinked thermoplastic elastomer is produced from a peroxidically crosslinkable olefinic copolymer rubber, a polyolefin resin not degradable by peroxide, and an organic peroxide. The components of the mixture are directly admitted into the double-screw extruder. Furthermore, EP 0 547 7843 A1 describes a one-stage process for producing a dynamically vulcanized thermoplastic elastomer, whereby an olefinic copolymer rubber and a thermoplastic polyolefin are here directly fed into a blending extruder. An organic peroxide is added farther downstream in the direction of flow in the plasticizing unit. The shear rate of the dynamic vulcanization is $>500$ s$^{-1}$. Single-screw, double-screw or multiple-screw extruders can be employed for the procedure described in said document.

The mixing methods known heretofore for producing a dynamically crosslinked thermoplastic elastomer are afflicted with the following problems:

It is not possible with a kneader (inner mixer) to achieve adequate dispersion and homogenization in the course of dynamic vulcanization of the elastomer phase. High shear rates can be achieved only inadequately or not at all due to the circumstances described in EP 0 107 635 B2. The production of soft blends with good extrudability is not possible with this process.

A double-screw extruder with screws revolving in the same sense is capable of assuring sufficient dispersion and homogenization. The production of soft, well-extrudable thermoplastic elastomers with a dynamically crosslinked elastomer phase is admittedly possible with this procedure; however, high shear rates of $>2000$ s$^{-1}$ are required. Such high shear rates and the mechanical energy introduced thereby in the plastic material are converted into heat, which leads to a considerable rise of the mean temperature of the melt in general and, in detail, to temperature and viscosity inhomogeneities because of the poor temperature conduction values. The high admission of energy simultaneously combined with rising mass temperatures leads to increased material stress, or even degradation of the material. Because of the surface conditions it is not possible with the known twin-screw extruder with screws revolving in the same sense to discharge again the admitted energy by means of the cooling system available, and to permit careful dispersion and homogenization in the course of dynamic vulcanization of the rubber phase. Fitting the pair of screws with conveying, mixing and kneading elements thus always constitutes a compromise between the admission of energy and the increase in mass temperature of the melt.

SUMMARY OF THE INVENTION

Now, the invention has as an object to provide a careful process for producing dynamically vulcanized thermoplastic elastomer compounds that permits very good dispersion and homogenization of a dynamically crosslinked thermoplastic elastomer with enhanced temperature control in the course of dispersion and dynamic vulcanization, combined with the result that thermoplastic vulcanisates with enhanced properties are obtained.

The process steps of the two variations essential to the invention are described as follows:

Variation A

The thermoplastic/thermoplastics and/or non-crosslinked rubber/rubbers are fed into the roll system via the feeding opening in the absence of the crosslinking agent, and are subsequently melted open and dispersed, with formation of a homogeneous mixture.

The homogeneous mixture is transported in the roll elements while the crosslinking agent is simultaneously added in a transition zone of the roll elements; and the mixture provided with the crosslinking agent is dispersed and homogenized as the vulcanization is being carried out simultaneously at expansion rates of 100 to 1500 s$^{-1}$, especially 500 to 1500 s$^{-1}$, with formation of the thermoplastic elastomer compound.

Variation B

The thermoplastic/thermoplastics and/or the crosslinked rubber/rubbers and the crosslinking agent are jointly fed into the roll system via the feed opening, and are subsequently melted open and dispersed; and the mixture is dispersed and homogenized at expansion rates of 100 to 1500 s$^{-1}$, especially 500 to 1500 s$^{-1}$, as vulcanization takes place at the same time, with formation of the thermoplastic elastomer material.

Furthermore, it is important in connection with either process variation that the calendered surface area per kilogram thermoplastic elastomer compound amounts to $\geq 75$ m$^2$, particularly $\geq 100$ m$^2$, in particular again to 100 to 300 m$^2$ based on the totality of roll elements.

According to both variations, the crosslinking activator and the additives such as, for example plasticizing oils, fillers, reinforcing agents, processing aids, anti-ageing agents, internal and external lubricants, if any, can be admitted into the roll system by way of the feeding opening or via another feeding point, whereby it is useful in connection with variation A if the crosslinking activator is admitted before the crosslinking agent is added.

If, within the framework of said two variations, only the thermoplastic material is fed into the roll system via the feeding opening, the non-crosslinked rubber can be admitted into the roll system by way of another feeding point. The same applies vice-versa, if only non-crosslinked rubber is first fed into the roll system via the feeding opening.

The novel process technology is described in detail in the following by way of example with the help of test results.

The process prepares the thermoplastic elastomer material in the form of individual kneaded beads, whereby effects are achieved similar to thos in rolling mills. Characteristic of the process as defined by the invention is the excellent dispersion and exact temperature control. As opposed to the known single-, double- or multiple-scew extruders employed in the production of thermoplastic vulcanisates, where the active flank of the screw transports the material in the direction of the outlet opening, the transport of the material is achieved in the present case through the axial forces generated when revolving toothed spindles engage a toothed main spindle. The toothing may have a pitch angle of 10° to 80°, in particular of 45°. The revolving spindles are driven by the rotation of the main spindle. Furthermore, as opposed to single- or double-screw extruders, in which a relatively compact bed of solids has to be melted open, an introduction of heat takes place in the process as defined by the invention, such admission of heat being very close to the introduction of heat in the processing in rolling mills. The special suitability of the process as defined by the invention for producing theroplastic vulcanisates results from the special flow conditions in the planetary part, in addition to the large surface areas where heat is to be exchanged. The material present in the cross section of the tooth is forced through the narrowing of the cross section of the flank gaps. The 45° toothing assures that a pressure maximum always develops only in points along the revolving spindles. Due to the small cross section in the head clearance of the toothing, locally high flow rate prevail there, which lead to good dispersion, homogenization and excellent flushing of the tooth base.

It has been found within the framework of tests that excellent dispersion of the vulcanized rubber phase is obtained if 1 kilogram of the thermoplastic elastomer mixture is rolled out throughout the entire process as defined by the invention to a surface area of 75 m$^2$ to 300 m$^2$. Preferred are in this connection surface areas of 100 to 300 m$^2$ per kg TPE.

BRIEF DESCRIPTION OF THE DRAWINGS

The diagram shows the particle division as a function of the form of flow (curve 1 for pure shear flow; curve 2 for biaxial extension flow) and the viscosity ratio of the dispersed phase in relation to the continuous phase. Further division of the dispersed phase is possible as long as the Weber number W$_e$ is greater than a critical Weber number W$_e$ critical

DETAILED DESCRIPTION OF PREFERRED EMBODIMENTS $$W_e = \frac{\eta_{CP}(\dot{\gamma}) \cdot \dot{\gamma} \cdot R}{\sigma_{12}} > W_{e\,crit} \cdot W_e = f(\text{flow form, } \lambda_1)$$

In summary, the individual parameters have the following meaning:

W$_e$=Weber number $\eta_{CP}$=viscosity of continuous phase (=thermoplastic in the present case)

$\eta_{DP}$=Viscosity of disperse phase (=rubber in the present case)

$\lambda_1$=ratio of viscosities $\dot{\gamma}$=shear rate $\sigma_{12}$=interface tension R=radius of disperse phase (=rubber in the present case)

W$_{e\,crit}$ is plotted in the diagram as the ordinate. Distinctly lower critical Weber numbers are obtained for the represented $\lambda_1$ viscosity ratio range (abscissa) for biaxial extension flows.

Said representation shows that especially the extension flows caused when the toothed revolving spindles engage the toothed main roll lead to more extensive division of the vulcanizing rubber particles.

With pure shear flow, particle division is possible only in a viscosity ratio range of disperse phase to continuous phase of about 0.1<$\eta_{DP}/\eta_{CP}$<4, namely in accordance with the area above curve 1 (=dispersion). Further division of the vulcanizing rubber particles is possible only with extension flows as present in the process as defined by the invention, namely in accordance with the area above curve 2 (dispersion). No dispersion, however, is possible below curves 1 and 2.

In the process as defined by the invention, the vulcanized thermoplastic vulcanisates with enhanced properties are treated with extension rates between the base of the tooth and the bridge of the tooth in the range of 100 to 1500 s$^{-1}$, particularly in a range of between 500 and 1500 s$^{-1}$.

Furthermore, it was found in the tests that the rate of reaction in the course of the dynamic vulcanization is highly dependent in a decisive measure on the introduced comparative tensions and the surface area of the processing set of machines rolled out per rotation. The process of the present invention produces per rotation, in a comparable period of dwelling time, a surface area larger by factor 2.5 to 3 than possible with single- or twin-screw extruders of the type employed at the present time.

In particular, the large rolled-out surface areas, in association with the high comparative tensions caused by the high extension rates, lead to a distinct increase in the crosslinking rate.

The following vulcanization times were determined in the set of machines (inside mixer, double-screw extruder, planetary roll extruder) employed in this treatment for a preferred degree of crosslinkage of the rubber phase of >90%. The degree of crosslinkage was determined by dissolving in cyclohexane at room temperature. The blending formula and the process parameters are summarized in tables 1 and 2, respectively. In parallel, the vulcanization time of the formula without thermoplastic material specified in table 1 was determined in a vulcameter. In this connection, $t_{v90}$=the time for a vulcanization reaction of 90%.

| | |
|---|---|
| Vulcameter | $t_{v90}$ = 9 minutes |
| Inside mixer | $t_{v90}$ = 4 minutes |
| Twin-screw extruder | $t_{v90}$ = 0.5 to 0.7 minute |
| Planetary roll extruder | $t_{v90}$ = 0.2 to 0.4 minute. |

Due to the large surface area rolled out per rotation of the main spindle, and the high number of place change processes connected therewith, it is possible with the process as defined by the invention to distinctly reduce the dwelling time required for vulcanizing the rubber phase, as compared to the existing process techniques. The minimum dwelling time in the presence of the crosslinking activator and the crosslinking agent amounts to less than 60 s, preferably to 10 to 30 s.

The thermoplastic elastomer compounds produced with the process as defined by the invention preferably have a degree of crosslinkage of the rubber phase of >90%, A roll system that is suitable for carrying out the process as defined by the invention is described in patent documents DE 91 11 406 U1, DE 37 25 641 C2, DE 37 12 749 C1, and DE 27 19 095 C2. Particularly suitable is a roll system according to DE 39 08 415 A. In the roll unit, both the main spindle and the cylinder jacket comprise liquid tempering, whereby the temperature can be effectively controlled especially with pressure-superposed water.

The process as defined by the invention was carried out within the framework of a test on a roll system preferably in the following way:

A planetary roll system of the firm ENTEX TP-we 70 M3 was employed in the tests. In general, any planetary roll system permitting the dwelling times and extension rates required for said process is suitable. The rubber, the thermoplastic material and additional powdery mixing components were fed to the feeding opening of a conveyor screw feeding the first planetary roll element. As rubber, 200 pbw (parts by weight) of an EPDM extended with 100 parts oil was used (Keltan 509×100 DSM). The ethylidene-norborne component came to 8% by weight. As thermoplastic component, 50 pbw of a polypropylene homopolymer with an MFI=0.7 was used (Moplen Q 30 P from Montell). 20 pbw of a calcined kaolin was added as filler (Polestar 200 R from ECC). 0.5 pbw Irganox 1010 (supplied by Ciba Additive GmbH) was metered in as anti-aging agent. Furthermore, 0.5 pbw zinc stearate (SM 101 supplied by Peter Greven) was added. 2 pbw zinc oxide active (from Bayer AG) and 1 pbw salicylic acid (from Hinrich Tietjen) was added as crosslinking activator. Possibilities for adding liquid and solid components are available in the transition zones between the first and second as well as every further planetary roll elements. Within the framework of the tests, the crosslinking agent was added according to the process variation "A" between the first and second roll elements. In the present case, the crosslinking agent was a solution of 5 pbw phenolic resin (Schenectady SP 1045 from Krahn Chemie) and 5 pbw of a paraffinic plasticizer (Sunpar 150 from Sunoil), whereby the solution was injected into the melt. In general, any other known crosslinking agent can be added to the rubber/thermoplastic melt; however, any such agent has to be suitable for the selected rubber. Also, crosslinking of the rubber phase with peroxides can be carried out particularly advantageously with the process as defined by the invention.

Owing to the short dwelling times and the exact temperature control in the course of the dynamic vulcanization it is possible to obtain thermoplastic vulcanisates with enhanced properties of the continuous polypropylene phase. This results from a lower degradation of the polypropylene by radicals originating in the process.

The dynamic vulcanization of the rubber phase takes place in the two planetary roll elements downstream. An amount of plasticizer oil depending on the desired hardness is added to the melt between the second and third roll elements. For a thermoplastic vulcanisate with a Shore-A hardness of 75, 15 pbw of a paraffinic plasticizer (Sunpar 150 supplied by Sunoil) was injected.

The melt is advantageously degassed under vacuum at the end of the third roll element. Granulating is subsequently carried out after the last roll element.

The dwelling time of the test mixture came to only 20 s at a speed (rpm's) of the central spindle of 140 min$^{-1}$ and a through-put rate of 105 kg/h. The length of the central spindle for the test roll system amounted to 1200 mm. In general, the central spindle may have a length of from 0.5 to 6 m. The planetary roll elements of the employed roll system were provided with water tempering. The coil conducting the flow of water is integrated in the surface of the roll cylinder. The mass temperature of the course of dynamic vulcanization amounts to 0 to 70° C., preferably 10° to 50° C. above the melting temperature of the thermoplastic material.

With the test mixture and in the preferred process, a mass temperature of 200° to 210° C. was measured on the outlet of the past planetary roll element. The mass temperature was measured with a thermometer inserted in the mass. Said mass temperature, therefore, is by 35° to 45° C. above the melting temperature of the polypropylene (Moplen Q 30 P supplied by Montell). Comparable tests carried out on a twin-screw extruder with a screw diameter of 40 mm and at screw speeds of from 350 to 450 min$^{-1}$ led to mass temperatures of 240° to 290° C.

The blending formula (table 1) and the process parameters (table 2) are summarized again within the framework of a final overview, in connection with the following explanations:

a=inner mixer b=double-screw extruder (Berstorff ZE 40)

c=planetary roll extruder (ENTEX TP-WE 70 M3)

Vulcanizing time: This is the time for vulcanizing the rubber phase, measured from the time the crosslinking agent is added until the material exits from the processing machine. For the double-screw extruder and the planetary roll extruder, the minimum dwelling times were determined after the crosslinking agent was added.

| | |
|---|---|
| Shore A | according to DIN 53505 |
| Ultimate tensile strength | according to ISO 527 |

-continued

| | |
|---|---|
| Elongation at rupture | according to ISA 527 |
| Pressure deformation test | ASTM D 395 B |
| | Test conditions: 25%, 70° C., 22 h, 30 min. |

TABLE 1

| | | |
|---|---|---|
| Keltan 509 × 100 | 200 pbw | 66.90% by wt. |
| Moplen Q 30 P | 50 pbw | 16.70% by wt. |
| Polestar 200 R | 20 pbw | 6.79% by wt. |
| Sunpar 150 | 20 pbw | 6.70% by wt. |
| Zinc oxide, active | 2 pbw | .67% by wt. |
| Zinc stearate | .5 pbw | .16% by wt. |
| Irganox 1010 | .5 pbw | .16% by wt. |
| Salicylic acid | 1.0 pbw | .32% by wt. |
| Resin SP 1045 | 5.0 pbw | 1.69% by wt. |
| Sum | 299 pbw | 100.00% by wt. |

TABLE 2

| | | a | b | c |
|---|---|---|---|---|
| Diameter | [mm] | — | 40 | 70 |
| Volume | [liter] | 1.2 | — | — |
| Length | [L/D or mm] | — | 48 | 1200 |
| Speed | [min$^{-1}$] | 150 | 400 | 140 |
| Vulcanization time | [s] | 240 | 35 | 15 |
| Through-put | [kg/h] | 8 | 73 | 105 |
| Mass temperature | [C. °] | 215 | 280 | 210 |
| Shore A | [SHE] | 75 | 71 | 74 |
| Ultimate tensile strength | [N/mm$^2$] | 4.8 | 4.6 | 5 |
| Elongation at break | [%] | 220 | 296 | 320 |
| Pressure deformation test | [%] | 45 | 48 | 40 |

What is claimed is:

1. A process for producing a thermoplastic elastomer material in the form of a mixture of at least one thermoplastic elastomer compound and at least one crosslinked rubber, said mixture being produced from the following mixture components comprising:
   at least one thermoplastic in an amount of 10% to 90% by weight; with the balance up to 100% by weight of
   at least one crosslinked rubber;
   a crosslinking activator; and
   a crosslinking agent;
   with the use of a roll system comprising a feeding opening of a conveyor screw feeding the first roll element, additional roll elements with feed points in a transition area of the roll elements, whereby each roll element has a main spindle and a plurality of revolving spindles, whereby the mixture components are fed into the roll system via the feeding opening and the feed points, comprising the following process steps:
   feeding the thermoplastic or the crosslinked rubber into the roll system in the absence of the crosslinking agent via the feeding point and subsequently melting and dispersing with formation of a homogeneous mixture;
   transporting the homogeneous mixture in the roll system while simultaneously adding the crosslinking agent in a transition area of the roll elements;
   dispersing the mixture provided with the crosslinking agent and homogenizing the mixture as vulcanization is simultaneously taking place at extension rates of 100 to 1500/s with formation of the thermoplastic elastomer material;
   whereby the calendered surface area per kilogram of thermoplastic elastomer compound amounts to $\geq 75$ m$^2$ based on the totality of roll elements.

2. The process according to claim 1, comprising adding the crosslinking activator before the crosslinking agent is added.

3. The process according to claim 1,
   wherein the calendered surface area per kilogram of thermoplastic elastomer compound amounts to $\geq 100$ m$^2$; and
   wherein said thermoplastic elastomer compound is polypropylene.

4. The process according to claim 1,
   wherein the division of the crosslinking rubber particles takes place at a value of $\eta_{DP}/\eta_{CP} \geq 4$ due to highly expanding flows as the revolving spindles engage the screw base of the main spindle;
   whereby $\eta_{DP}$ is the viscosity of the disperse phase and $\eta_{CP}$ is the viscosity of the continuous phase.

5. The process according to claim 1,
   wherein the extension rates amount to 500 to 1500 s$^{-1}$.

6. The process according to claim 1,
   wherein the dwelling time of the mixture amounts to $\leq 60$ s, based on the totality of roll elements.

7. The process according to claim 1,
   wherein the crosslinking time of the rubber amounts to $\leq 30$ s.

8. The process according to claim 1,
   wherein the temperature of the thermoplastic elastomer compound at the time of exit of the compound from the last roll element does not exceed the melting temperature of the thermoplastic material by more than 70° C.

9. The process according to claim 1,
   wherein the roll system has an overall length of 0.8 to 6 m based on the totality of roll elements.

10. The process according to claim 1,
    wherein the rubber is crosslinked to an extent such that not more than 10% by weight of the rubber is soluble in a rubber solvent; and
    wherein the dwelling time of the mixture ranges from 10 to 30 seconds based on the totality of roll elements.

11. The process according to claim 1,
    wherein the melted thermoplastic elastomer compound is degassed under vacuum.

12. The process according to claim 1, comprising employing a planetary roll extruder as said roll system.

13. A process for producing a thermoplastic elastomer compound in the form of a mixture of at least one thermoplastic elastomer compound and at least one crosslinked rubber, said mixture being produced from the following mixture components comprising:
    at least one thermoplastic in an amount of 10% to 90% by weight; with the balance up to 100% by weight of
    at least one crosslinked rubber;
    a crosslinking activator; and
    a crosslinking agent;
    with the use of a roll system comprising a feeding opening of a conveyor screw feeding a first roll element, additional roll elements with feed points for adding other components in a transition area of the roll elements, whereby each roll element has a main spindle and a plurality of revolving spindles, and whereby the components of the mixture are fed into the roll system via the feeding opening and the feed points; comprising the following process step:

jointly feeding the thermoplastic and the crosslinked rubber and the crosslinking agent into the roll system via the feeding opening and subsequently melting and dispersing;

dispersing the mixture and homogenizing as vulcanization is simultaneously taking place at extension rates of 100 to 1500/s, with formation of the thermoplastic elastomer compound;

whereby the calendered surface area per kilogram of thermoplastic elastomer compound amounts to $\geq 75$ m$^2$ based on the totality of roll elements.

14. The process according to claim 13, comprising adding the crosslinking activator before the crosslinking agent is added.

15. The process according to claim 13, wherein the calendered surface area per kilogram of thermoplastic elastomer compound amounts to $\geq 100$ m$^2$, and wherein said thermoplastic elastomer compound is polypropylene.

16. The process according to claim 13, wherein the division of the crosslinking rubber particles takes place at a value of $\eta_{DP}/\eta_{CP} \geq 4$ due to highly expanding flows as the revolving spindles engage the screw base of the main spindle, whereby $\eta_{DP}$ is the viscosity of the disperse phase and $\eta_{CP}$ is the viscosity of the continuous phase.

17. The process according to claim 13, wherein the extension rates amount to 500 to 1500 s$^{-1}$.

18. The process according to claim 13, wherein the dwelling time of the mixture amounts to $\leq 60$ s based on the totality of roll elements.

19. The process according to claim 13, wherein the crosslinking time of the rubber amounts to $\leq 30$ s.

20. The process according to claim 13, wherein the temperature of the thermoplastic elastomer compound at the time of exit of the compound from the last roll element does not exceed the melting temperature of the thermoplastic material by more than 70° C.

21. The process according to claim 13, wherein the roll system has an overall length of 0.8 to 6 m based on the totality of roll elements.

22. The process according to claim 13, wherein the rubber is crosslinked to an extent such that not more than 10% by weight of the rubber is soluble in a rubber solvent; and wherein the dwelling time of the mixture ranges from 10 to 30 seconds based on the totality of the roll elements.

23. The process according to claim 13, wherein the melted thermoplastic elastomer compound is degassed under vacuum.

24. The process according to claim 13, comprising employing a planetary roll extruder as roll system.

* * * * *